United States Patent
Lynn et al.

(10) Patent No.: US 8,255,811 B2
(45) Date of Patent: Aug. 28, 2012

(54) PROVIDING AUTO-SORTING OF COLLABORATIVE PARTNERS OR COMPONENTS BASED ON FREQUENCY OF COMMUNICATION AND/OR ACCESS IN A COLLABORATION SYSTEM USER INTERFACE

(75) Inventors: Angelo Lynn, Boston, MA (US); Latoya Sankey, Malden, MA (US); Ebubechukwu I. Okafor, Mattapan, MA (US); Doris L. Jones, Somerville, MA (US); Chenita D. Daughtry, Roxbury, MA (US); Razeyah Stephen, Marlboro, MA (US); Daniel B. Kehn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/614,012

(22) Filed: Dec. 20, 2006

(65) Prior Publication Data

US 2008/0155471 A1    Jun. 26, 2008

(51) Int. Cl.
*G06F 3/00* (2006.01)
(52) U.S. Cl. ........ 715/753; 715/757; 715/758; 715/789; 715/811
(58) Field of Classification Search .................. 715/751, 715/753, 755–758, 789, 811
See application file for complete search history.

(56) References Cited

U.S. PATENT DOCUMENTS

| | | | |
|---|---|---|---|
| 6,301,609 B1 | 10/2001 | Aravamudan et al. | |
| 6,900,835 B2 | 5/2005 | Cazier et al. | |
| 7,039,639 B2 | 5/2006 | Brezin et al. | |
| 2001/0002469 A1* | 5/2001 | Bates et al. | 707/1 |
| 2003/0055897 A1* | 3/2003 | Brown et al. | 709/205 |
| 2003/0065721 A1* | 4/2003 | Roskind | 709/204 |
| 2003/0125016 A1 | 7/2003 | Tsuchiyama | |
| 2004/0056901 A1 | 3/2004 | March et al. | |
| 2004/0111479 A1* | 6/2004 | Borden et al. | 709/206 |
| 2004/0172456 A1 | 9/2004 | Green et al. | |
| 2004/0199582 A1 | 10/2004 | Kucharewski et al. | |
| 2005/0060638 A1* | 3/2005 | Mathew et al. | 715/500 |

(Continued)

FOREIGN PATENT DOCUMENTS

GB    2 354 134 A    3/2001

(Continued)

*Primary Examiner* — Ba Huynh
(74) *Attorney, Agent, or Firm* — David A. Dagg

(57) ABSTRACT

A system for auto-sorting of lists based on most frequent component access or partner collaboration. The elements in the lists may represent collaboration partners (e.g. instant messaging contacts), and/or collaboration components such as Web addresses, events, collaborative documents, activity objects, and/or desktop applications. The system monitors component accesses and/or partner collaborations over a configurable time period to determine the frequency of collaborations with specific collaboration partners, and/or the frequency of accesses to collaboration components. The disclosed system then determines a set of collaboration partners and/or components that are most frequently collaborated with and/or accessed, and moves the list elements representing those collaboration partners and/or components into a top-located sub-list within a list of elements representing a larger number of collaboration partners and/or components in a user interface provided to a local user. The size of the top-located sub-list is user configurable, and the user may further indicate that certain collaboration partners and/or components are to be added to the sub-list, removed from the sub-list, always excluded from the sub-list, or always included in the sub-list. The local user may also be provided with a configurable set of alert notifications through the user interface communicating when collaboration partners and/or components have been added to and/or removed from the sub-list.

17 Claims, 8 Drawing Sheets

U.S. PATENT DOCUMENTS

| | | | |
|---|---|---|---|
| 2005/0076109 A1* | 4/2005 | Mathew et al. | 709/223 |
| 2005/0114829 A1* | 5/2005 | Robin et al. | 717/101 |
| 2005/0198131 A1 | 9/2005 | Appelman et al. | |
| 2005/0198172 A1 | 9/2005 | Appelman et al. | |
| 2006/0031366 A1 | 2/2006 | Dolph | |
| 2006/0085752 A1* | 4/2006 | Beadle et al. | 715/751 |
| 2006/0167991 A1 | 7/2006 | Heikes et al. | |
| 2006/0242639 A1* | 10/2006 | Manion et al. | 717/169 |
| 2007/0047697 A1* | 3/2007 | Drewry et al. | 379/88.13 |
| 2009/0138828 A1* | 5/2009 | Schultz et al. | 715/853 |

FOREIGN PATENT DOCUMENTS

| | | |
|---|---|---|
| WO | WO 98/27706 A | 6/1998 |

\* cited by examiner

PROVIDING AUTO-SORTING OF COLLABORATIVE PARTNERS OR COMPONENTS BASED ON FREQUENCY OF COMMUNICATION AND/OR ACCESS IN A COLLABORATION SYSTEM USER INTERFACE

FIELD OF THE INVENTION

The present invention relates generally to user interfaces for collaborative software systems, such as instant messaging systems, and more specifically to a method and system for auto-sorting of collaborators and/or components based on frequency of collaboration in a collaboration system user interface.

BACKGROUND OF THE INVENTION

As it is generally known, collaborative software system users may work with large lists of collaborative partners and components in a computer desktop environment. Such collaborative partners and components include instant messaging contacts, Web addresses, events, collaborative documents, activity objects, and computer desktop applications. As a result of the size of such lists, it can be time consuming for the user to find certain partners or components that they collaborate with frequently.

Some existing computer desktop applications, such as e-mail applications, instant messaging applications, and calendaring applications, provide alphabetical sorting of lists they display to help with this problem. However, these features are typically insufficient with regard to solving the general problem of quickly locating a collaborative partner or component in a large list.

For example, instant messaging systems are a type of collaboration software system in which this problem is commonly encountered. As it is generally known, instant messaging is a form of real-time (or "synchronous") communication between two or more users. In typical instant messaging systems, text and other types of information is conveyed among the users involved in an instant messaging session via application programs running on computers connected over a data communication network such as the Internet. Typical instant messaging systems require the use of a client program associated with an instant messaging service. Instant messaging differs from electronic mail ("e-mail") and other asynchronous communication systems in that instant messaging sessions occur in real-time, with all session participants simultaneously on-line. Most existing instant messaging services offer a presence information feature, visually indicating to a local user the on-line status (e.g. "on-line", "off-line", "unavailable", etc.) of users of interest to the local user. The list of users of interest to the local user, is referred to herein for purposes of explanation as the local user's "contact list". A user's contact list continuously indicates to him or her which users of interest are currently available for an instant messaging session. Existing systems also provide the ability for a user to categorize the users within their contact list into various groups. Examples of existing instant messaging services on the public Internet include AOL® Instant Messenger (AIM), Google® Talk, iChat, ICQ, Jabber, Skype, Trillian and Yahoo!® Messenger.

For instant messaging system users with relatively large contact lists (e.g. containing over one hundred contacts), and/or a large number of user groups within their contact list, finding a particular contact in the contact list to start an instant messaging session with can be significantly time consuming.

In most existing instant messaging applications (e.g. AIM and Yahoo!® Messenger), the user is provided with the option of sorting contacts alphabetically within the contact list to help with this problem. However, if the identifiers of users in the contact list are aliases (e.g. nicknames or e-mail addresses), it may still be difficult to remember the aliases/e-mail addresses of all users in the contact list. Accordingly, as seen in the example of instant messaging collaboration software systems, alphabetical sorting does not necessarily result in providing the user with the ability to quickly locate a specific collaborating partner or component within a large list.

Some existing systems have provided sorting of components and/or collaborating partners in a user interface that prominently shows the most recently accessed files or most recent accessing people. However, such existing systems also do not effectively predict the components and/or collaborating partners that are most likely to be accessed.

For the above reasons it would be desirable to have a new system for providing a user interface to an collaborative software system, such as an instant messaging system, that provides a representation of a list of collaborating partners or components, such as an instant messaging system's contact list, that makes it easier for the user to locate a particular collaborating partner and/or component.

SUMMARY OF THE INVENTION

To address the above described and other shortcomings of previous solutions, the disclosed system provides a method and system for auto-sorting of lists based on most frequent component access or partner collaboration. The elements in the lists may represent collaboration partners (e.g. instant messaging contacts), and/or collaboration components such as Web addresses, events, collaborative documents, activity objects, and/or desktop applications. The disclosed system monitors component accesses and/or partner collaborations over a configurable time period to determine the frequency of collaborations with specific collaboration partners, and/or the frequency of accesses to collaboration components. The disclosed system then determines a set of collaboration partners and/or components that are most frequently collaborated with and/or accessed, and moves the list elements representing those collaboration partners and/or components into a top-located sub-list within a list of elements representing a larger number of collaboration partners and/or components in a user interface provided to a local user. The size of the top-located sub-list is user configurable, and the user may further indicate that certain collaboration partners and/or components are to be added to the sub-list, removed from the sub-list, always excluded from the sub-list, or always included in the sub-list. The local user may also be provided with a configurable set of alert notifications through the user interface communicating when collaboration partners and/or components have been added to and/or removed from the sub-list.

List element sorting within the top-located sub-list may differ from that used in the remainder of the user interface list. For example, list elements within the top-located sub-list may be based on frequency of collaboration and/or access, whereas sorting of the remaining elements in the list may be alphabetical.

In an instant messaging system embodiment of the disclosed system, an instant messaging system user's contact list is organized such that contacts with whom the user has most frequently had instant messaging sessions, referred to herein as "frequent chatters", are located at the top of the contact list. The frequent chatters are determined based on the number of instant messaging sessions (one example of a collaboration indicator) they have had with the user over a predetermined time period. As a result, contacts that are more likely to be desired for instant messaging sessions are more likely to be immediately visible, thus eliminating the need for extensive, time consuming searching through a long contact list. In such an embodiment, the user's current on-line status can be broadcast differently to contacts in the frequent chatters sub-list from how it is broadcast to all other users. For example, this enables the user to define a setting causing contacts within the frequent chatters sub-list to see the user as available, while all other users see the user as unavailable.

While in the previous paragraph an embodiment is described in which the number of instant messaging sessions is used as a collaboration indicator, the disclosed system is not limited to such indicators, and may alternatively be embodied using any other appropriate indicator for a given embodiment, e.g. the number of message interchanges.

Thus there is disclosed a new system for providing a user interface to an collaboration system, such as an instant messaging system, that provides an improved representation of a list of collaborating partners or components, such as an instant messaging system's contact list, through which it is easier for the user to locate a particular collaborating partner and/or component.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
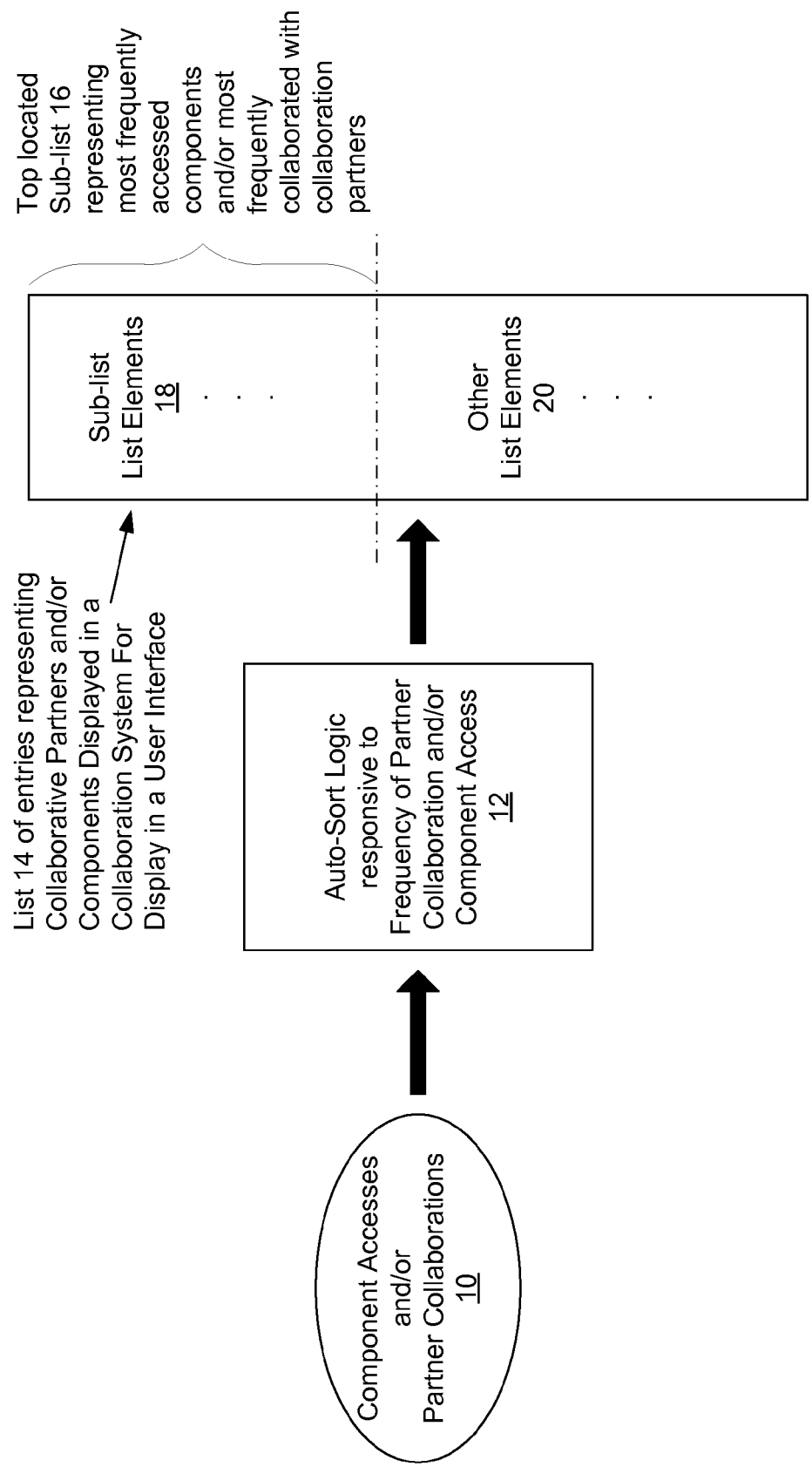
FIG. 1 is a block diagram showing an illustrative embodiment of the disclosed system.

FIG. 1 is a block diagram showing an illustrative embodiment of the disclosed system. As shown in FIG. 1, the disclosed system operates to monitor Component Accesses and/or Collaborative Partner Collaborations 10 over a configurable time period. For example, the monitoring of the Component Accesses and/or Collaborative Partner Collaborations 10 is performed in the embodiment of FIG. 1 by the Auto-Sort Logic 12. The Auto-Sort Logic 12 may be embodied by a software program executing on one or more computer systems, such as on a client computer system associated with a local user, and/or distributed among one or more communicably connected server systems.

The Component Accesses and/or Collaborative Partner Collaborations 10 may, for example, include communications between collaborative partners, such as communications among collaborating users including the local user, and/or component accesses performed by collaborating partners (e.g. the local user and/or other members of an associated collaboration team) to components shared in a collaboration system. Such components may, for example, include Web addresses, events, collaborative documents, activity objects, and computer desktop applications.

Further during operation of the embodiment shown in FIG. 1, the Auto-Sort Logic 12 generates the List 14 of list elements representing Collaborative Partners and/or Components in a Collaboration System. The List 14 is generated for display to the local user in a graphical user interface. The List 14 includes a top-located Sub-list 16 of most frequently accessed components and/or most frequently collaborated with collaboration partners. Accordingly, the Sub-list Elements 18 represent the most frequently accessed components and/or most frequently collaborated with collaboration partners. The List 14 further includes Other List Elements 20, representing other collaboration partners and/or components not included in the Sub-list 16.

Figure 2:
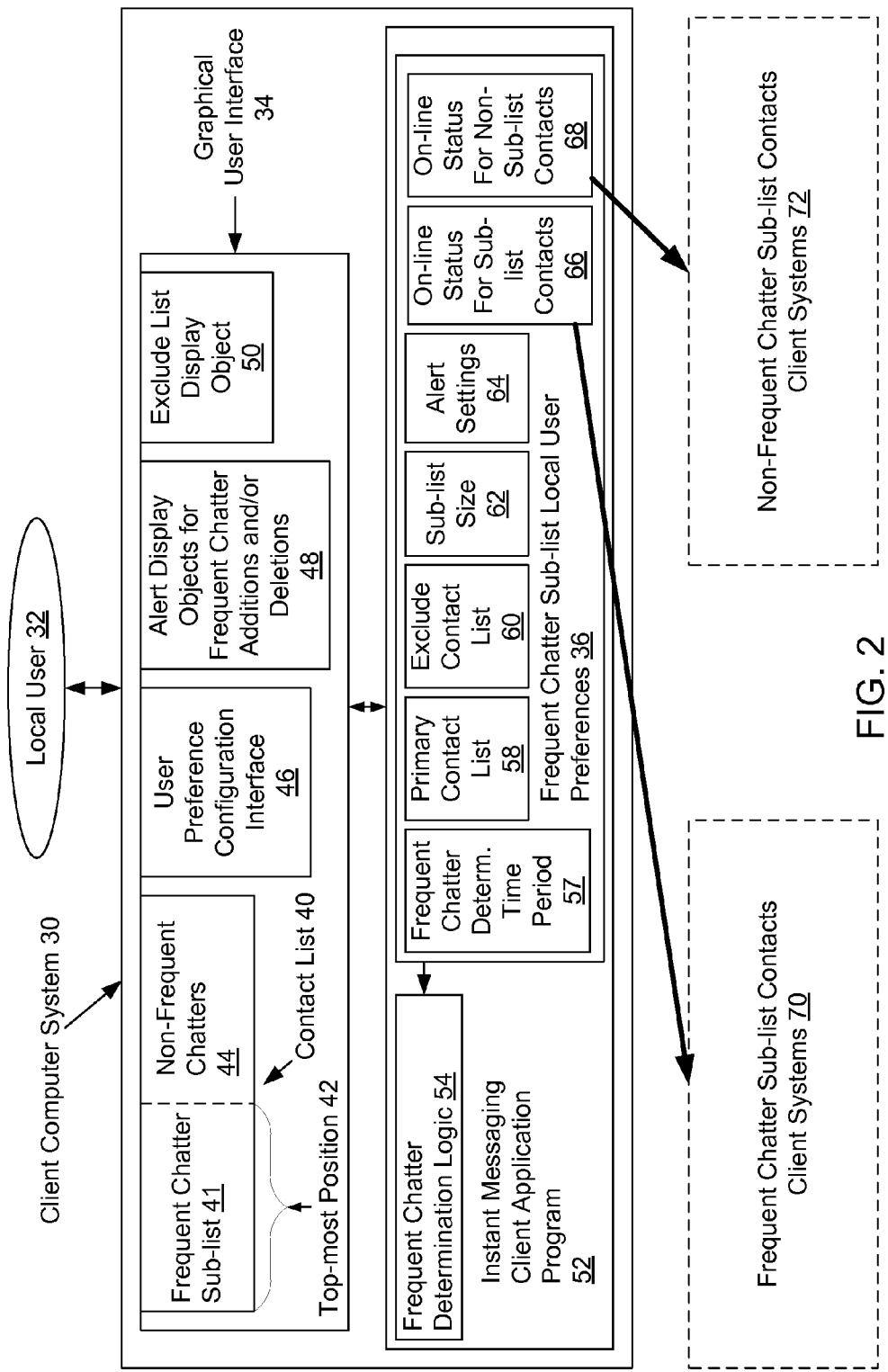
FIG. 2 is a block diagram showing components in an exemplary embodiment of the disclosed system for an instant messaging system.

FIG. 2 is a block diagram showing components in an illustrative embodiment of the disclosed system for an instant messaging system. As shown in FIG. 1, a Client Computer System 30 associated with and used by a Local User 32 provides a Graphical User Interface 34 to the Local User 32. The Graphical User Interface 34 is shown including a Contact List 40, having a Frequent Chatter Sub-list 41 displayed in a Top-most Position 42. The Contact List 40 further includes Non-Frequent Chatters 44 located below the Top-most Position 42. The Graphical User Interface 44 further includes a User Preference Configuration Interface 46, Alert Display Objects 48 for Frequent Chatter Additions and/or Deletions, and an Exclude List Display Object 50. The Graphical User Interface 34 may be any specific type of interactive user interface. The Graphical User Interface 34 may be navigated using any specific type of user interface device provide as part of the Client Computer System 30, such as a computer keyboard or mouse, and/or using voice commands or the like.

The Graphical User Interface 34 is provided by execution of an Instant Messaging Client Application Program 52 on the Client Computer System 30. The Instant Messaging Client Application Program 52 is shown including Frequent Chatter Determination Logic 54, and Frequent Chatter Sub-list Local User Preferences 56. The Frequent Chatter Sub-list Local User Preferences 56 are shown including a Frequent Chatter Determination Time Period 57, a Primary Contact List 58, an Exclude Contact List 60, a Sub-list Size 62, Alert Settings 64, On-line Status for Sub-list Contacts 66, and On-line Status for Non-Sub-list Contacts 68.

During operation of the embodiment shown in FIG. 2, the Frequent Chatter Determination Logic 54 operates to determine the Frequent Chatter Sub-list Local User Preferences 56 from the Local User 32, for example through the User Preference Configuration Interface 46. Based on the Frequent Chatter Sub-list Local User Preferences 56, the Frequent Chatter Determination Logic 54 operates to count the number of instant messaging sessions (or other appropriate measure of collaborative interactions, e.g. total instant messaging or other collaborative interaction duration) in which each contact participates with the Local User 32 during a counting time period equal to the Frequent Chatter Determination Time Period 57 (e.g. 30 days). Based on the resulting per-contact instant messaging session counts, the Frequent Chatter Determination Logic 54 determines a Frequent Chatter Sub-list 41 containing a number of contacts equal to the Sub-list Size 62 that have the highest number of instant messaging sessions with the Local User 32 over the most recent counting time period. Contacts that are listed in the Primary Contact List 58 are always included in the Frequent Chatter Sub-list 41, and contacts that are listed in the Exclude Contact List 60 can never be included in the Frequent Chatter Sub-list 41.

Responsive to the Alert Setting 64, the Frequent Chatter Determination Logic 54 may further operate to provide one or more of the Alert Display Objects 48 to information the Local User 32 that a contact has been added to the Frequent Chatter Sub-list 41, and/or that a contact has been removed from the Frequent Chatter Sub-list 41.

Further during operation of the Frequent Chatter Determination Logic 54, the disclosed system may operate to send the On-line Status for Sub-list Contacts 66 to the Client Systems 70 of contacts that are listed in the Frequent Chatter Sub-list 61, and to send the On-line Status for Non-Sub-list Contacts 68 to Client Systems 72 of contacts not listed in the Frequent Chatter Sub-list 41. This enables the Local User 32, for example, to indicate an "Available" or "On-line" status to contacts listed in the Frequent Chatter Sub-list 41, while indicating an "Unavailable" or "Off-line" status to contacts not listed in the Frequent Chatter Sub-list 41.

Figure 3:
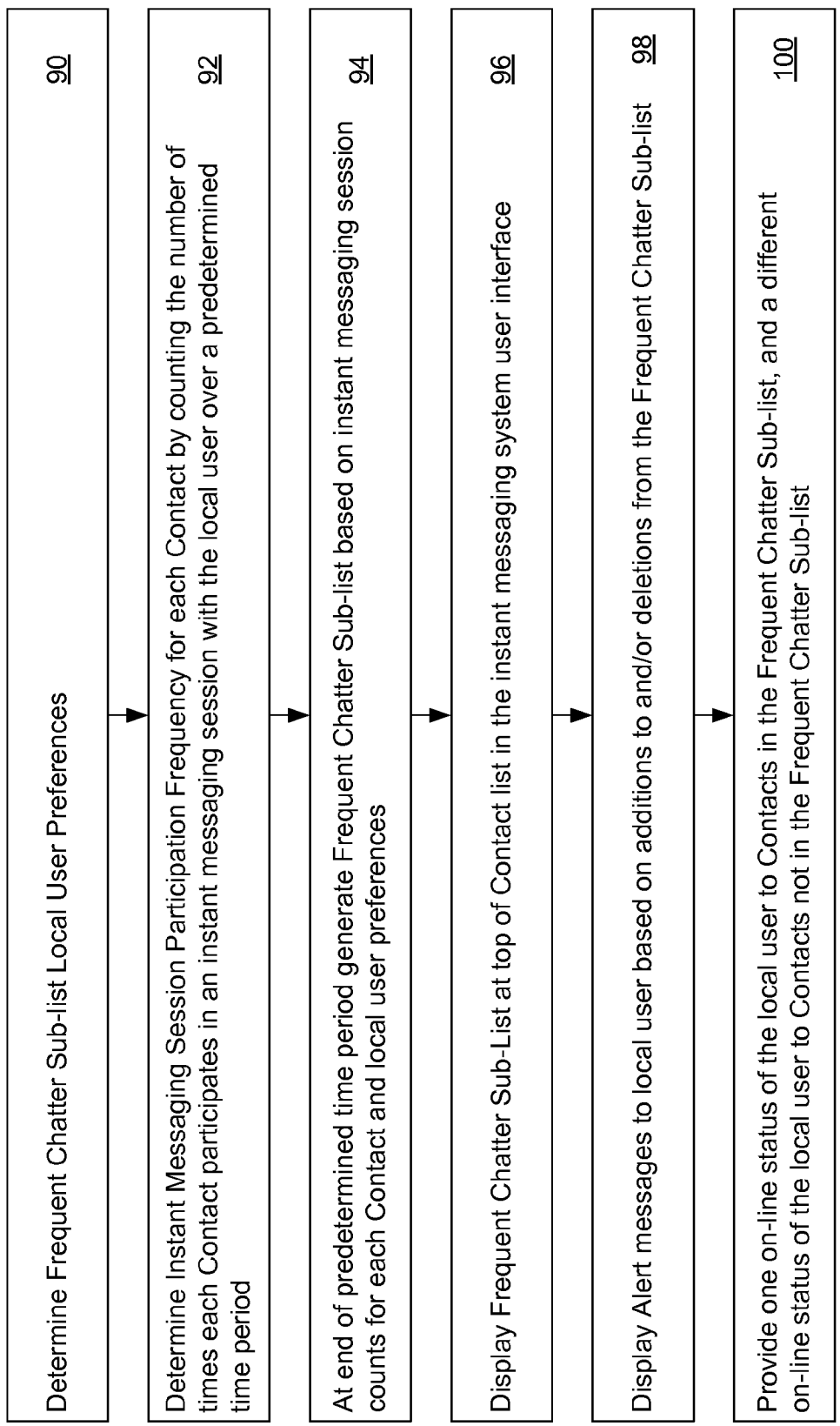
FIG. 3 is a flow chart showing steps performed during operation of the embodiment of the disclosed system shown in FIG. 2.

FIG. 3 is a flow chart showing steps performed during operation of an instant messaging system embodiment of the disclosed system. The steps of FIG. 3 are, for example, performed during operation of the Frequent Chatter Determination Logic 54 shown in FIG. 2. As shown in FIG. 3, at step 90, the disclosed system determines a number of preferences for the local user regarding determination of and/or further processing related to a list of contacts that most frequently participate in instant messaging sessions with the local user, referred to as the frequent chatter sub-list. For example, the disclosed system may operate at step 90 determine a user setting indicating the time period over which instant messaging sessions should be counted in order to determine the contacts that most frequently participate in instant messaging sessions with the local user, a list of contacts that are to always be included in the frequent chatter sub-list, a list of contacts that are always to be excluded from the frequent chatter sub-list, a size in terms of contacts of the frequent chatter sub-list, a number of alert settings defining conditions under which the local user is to be alerted in response to changes in the frequent chatter sub-list, an on-line status to be provided to contacts contained in the frequent chatter sub-list, and an on-line status to be provided to contacts not contained in the frequent chatter sub-list.

At step 92, the disclosed system operates to determine instant messaging session participation frequency for each contact by counting the number of times each contact participates in an instant messaging session with the local user over a predetermined time period (e.g. a user configured time period equal to 30 days). At step 94, at the end of the predetermined time period, the disclosed system generates a new frequent chatter sub-list based on instant messaging session counts for each contact and the local user's preferences.

At step 96, the disclosed system displays the frequent chatter sub-list at the top of the contact list display object within the instant messaging system user interface. The disclosed system also displays alert messages to the local user in response to additions to and/or deletions from the frequent chatter sub-list. For example, the local user may define a preference indicating that whenever a certain user is added to the frequent chatter sub-list, an alert message is to be displayed informing them of that fact. Similarly, the local user may define a preference indicating that whenever a certain user is removed from the frequent chatter sub-list, an alert message is to be displayed informing them of that fact, and optionally offering the local user the option of designating the user as a "Primary" contact. At step 100, the disclosed system provides a first on-line status of the local user (e.g. "available" or "on-line") to contacts contained in the frequent chatter sub-list, and a second on-line status of the local user (e.g. "unavailable" or "off-line") to contacts not listed in the frequent chatter sub-list.

Figure 4:
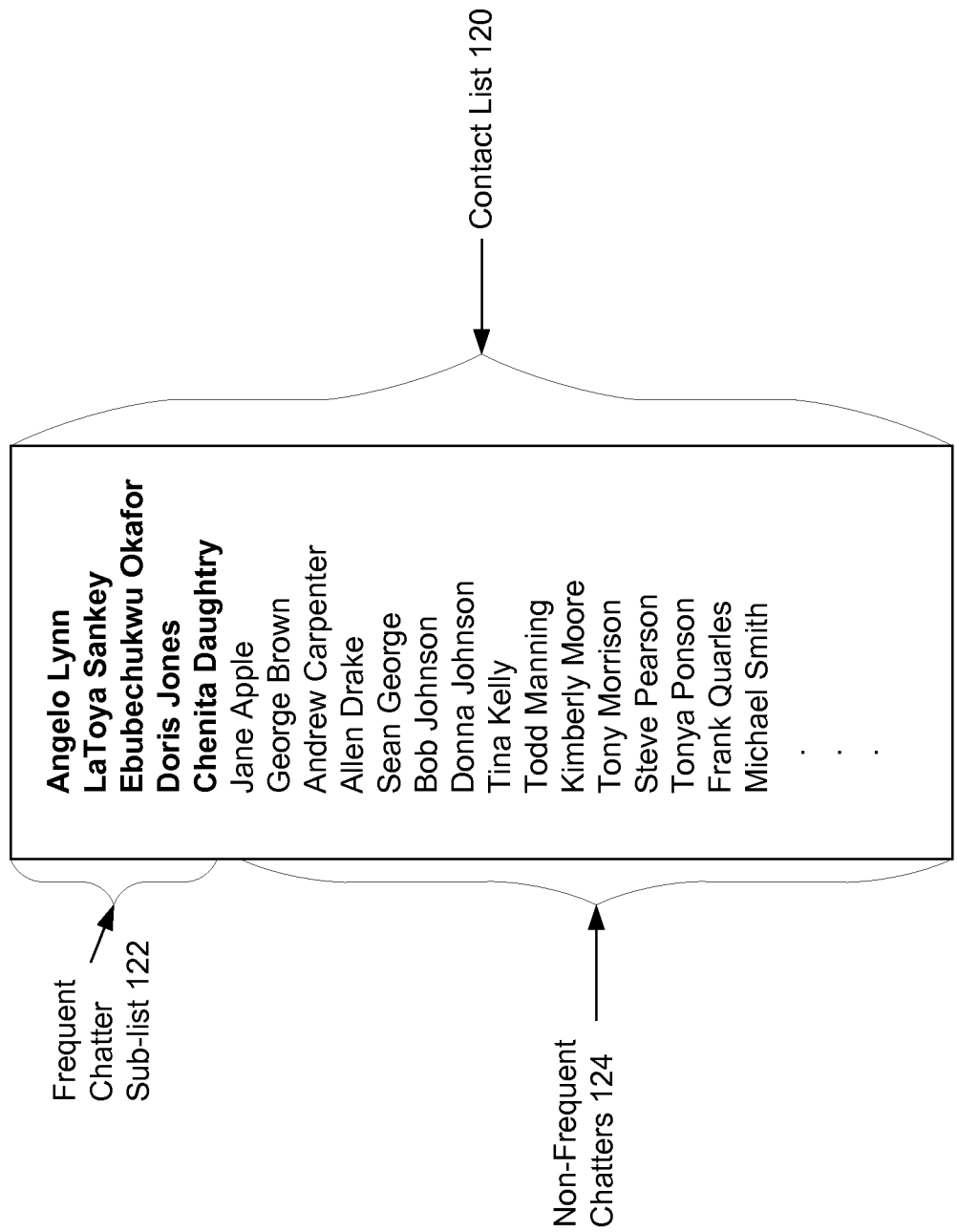
FIG. 4 is a partial screen shot showing an example of a contact list display generated by an illustrative embodiment of the disclosed system.

FIG. 4 is a partial screen shot showing an example of a Contact List display object 120 generated in a user interface by an illustrative instant messaging embodiment. The Contact List 120 is an example of a collection of screen names or the like stored in and displayed by an instant messaging program on behalf of the local user. Those skilled in the art will recognize that some existing instant messaging systems refer to their contact lists alternatively as lists of "buddies" (e.g. AOL). The names in the Contact List 120 may, for example, be screen names defined by and representing actual users that have registered with and are accordingly known by an underlying instant messaging service. In one embodiment, double-clicking by the local user on any name in the Contact List 120 causes an instant messaging session to be initiated between the local user and the other user represented by that name. While for purposes of concise illustration the Contact List 120 does not show an on-line status of each user corresponding to a name in the Contact List 120, such status information may additionally be provided in visual proximity to each name in the Contact List 120, as may be appropriate for a given embodiment.

As shown in FIG. 4, the Contact List 120 includes a Frequent Chatter Sub-list 122 located in a top-most portion of the Contact List 120. In the example of FIG. 4, the Frequent Chatter Sub-list is both located in the top-most portion of the Contact List 120, and made visually distinct from the remainder of the Contact List 120 by displaying the contacts in the Frequent Chatter Sub-list 122 in bold text, while the contacts in the Non-Frequent Chatters 124 are displayed in regular text. It should be understood that this is just one way in which such a visual distinction may be provided, and any other specific technique for providing visual distinctiveness of the Frequent Chatter Sub-list 122 may be used in the alternative. Moreover, while there are only five contacts listed in the Frequent Chatter Sub-list 122 shown in FIG. 4, any specific number of contacts may be included in the Frequent Chatter Sub-list 122, depending on how the local user has defined the size of the Frequent Chatter Sub-list 122. In one embodiment, a default size of five is set for the Frequent Chatter Sub-list 122, which may be over-written as needed by the local user up to a maximum of 20.

Figure 5:
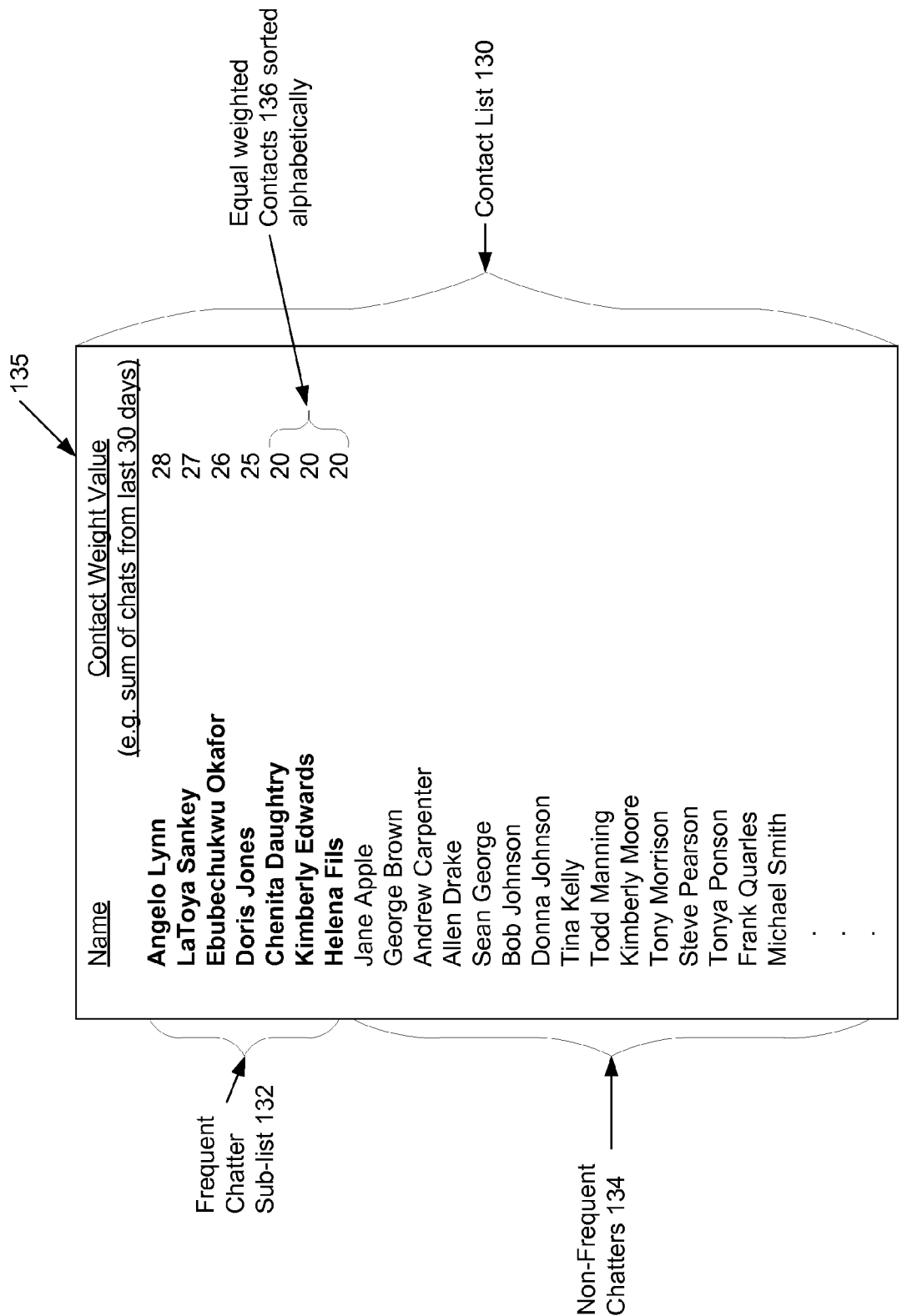
FIG. 5 is a partial screen shot showing an example of a contact list display object generated by an illustrative embodiment of the disclosed system, and showing contact weight values.

As shown in the exemplary Contact List 130 of FIG. 5, the contacts within the Frequent Chatter Sub-list 132 may be sorted based on a first contact characteristic, e.g. in descending order of chat frequency over the last 30 days (shown in the Contact Weight Value column 135), while the contacts outside the Frequent Chatter Sub-list 132 (i.e. within the Non-Frequent Chatters 134) may be sorted based on a second contact characteristic, e.g. in alphabetical order of contact names (i.e. screen names). As also shown in FIG. 5, the disclosed system operates such that contacts within groups of equally weighted contacts (contacts that have chatted with the local user an equal number of times over the last time period), such as those contacts within the group 136 shown in FIG. 5, are sorted alphabetically.

Figure 6:
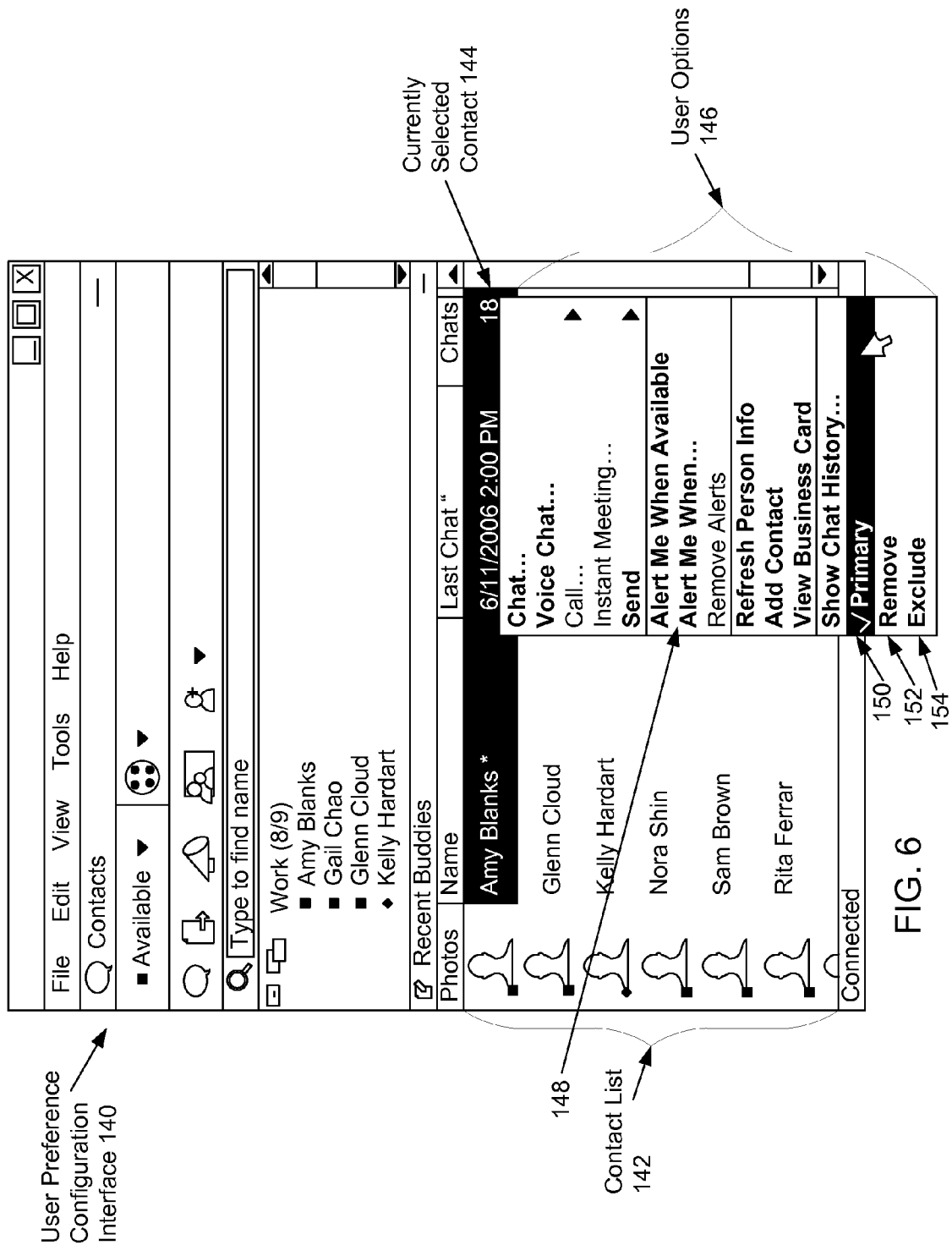
FIG. 6 is a partial screen shot showing an example of a user preference configuration interface display object generated by an illustrative embodiment of the disclosed system.

FIG. 6 is a partial screen shot showing an example of a User Preference Configuration Interface display object 140 generated by an illustrative embodiment of the disclosed system. The User Configuration Interface display object 140 is shown including a Contact List 142, within which a contact with a name of Amy Blanks is the Currently Selected Contact 144, for example as a result of the local user clicking on that contact within the Contact List 144. A User Options menu 146 is displayed from which the local user can select specific configuration options. If the user clicks on the Alert Me When option 148, the disclosed system enables the user to indicate that an alert is to be displayed in response to the Currently Selected Contact 144 being added to the frequent chatter sub-list, and/or in response to the Currently Selected Contact 144 being removed from the frequent chatter sub-list. If the local user clicks on the Primary option 150, then the disclosed system operates to store the Currently Selected Contact 144 in a list of primary contacts that can never be automatically removed from the frequent chatter sub-list. If the local user clicks on the Exclude option 154, then the disclosed system operates to store the Currently Selected Contact 144 in a list of excluded contacts that can never be automatically included in the frequent chatter sub-list. And if the user clicks on the Remove option 152, then the disclosed system operates to remove the Currently Selected Contact 144 from the frequent chatter sub-list until the next time the frequent chatter sub-list is calculated. If, after being removed from the frequent chatter sub-list through the Remove option 152, the Currently Selected Contact 144 is subsequently determined to be within the frequent chatter sub-list the next time the frequent chatter sub-list is calculated, then the disclosed system will at that time again include that contact within the frequent chatter sub-list. The options 156 may further include a Show Exclude List option that is displayed when the number of contacts contained in the Exclude Contact List 58 (FIG. 2) is non-zero, and that enables the user to cause the Exclude List Display Object 150 of FIG. 7, or the like, to be displayed.

Figure 7:
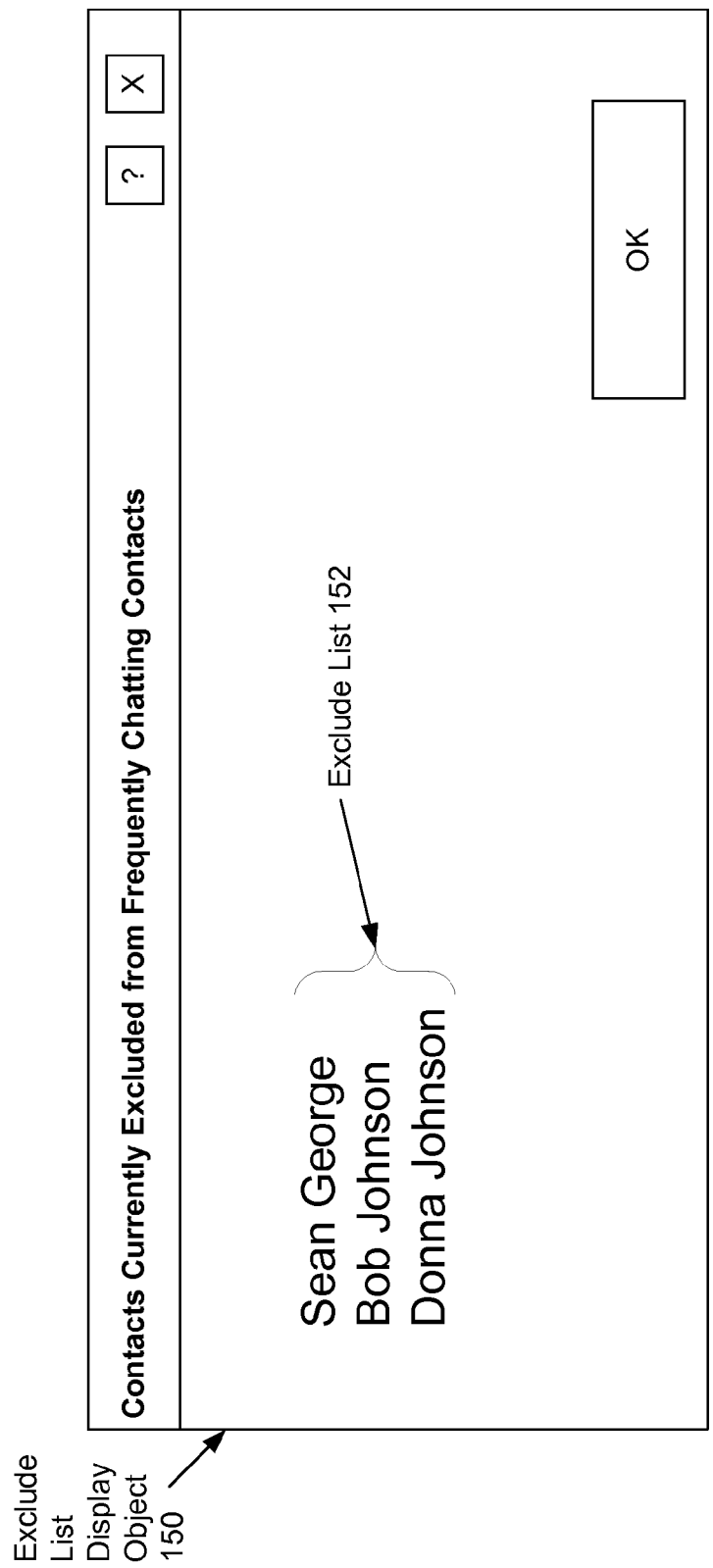
FIG. 7 is a partial screen shot showing an exclude list display object generated by an illustrative embodiment of the disclosed system.

FIG. 7 is a partial screen shot showing an example of an Exclude List Display Object 150 generated by an illustrative embodiment. The Exclude List Display Object 150 is an example of the Exclude List Display Object 50 of FIG. 2. As shown in FIG. 7, the Exclude List Display Object 150 is a pop-up window containing an Exclude List 152 showing the contacts that are currently excluded from being added to the frequent chatter sub-list. Those skilled in the art will recognize that while a pop-up window is shown in FIG. 7 to provide the local user with the Exclude List 152, the disclosed system is not limited to such an approach, and may alternatively be embodied to generate any specific kind of alert display object to the local user in order to provide the local user with the Exclude List 152.

Figure 8:
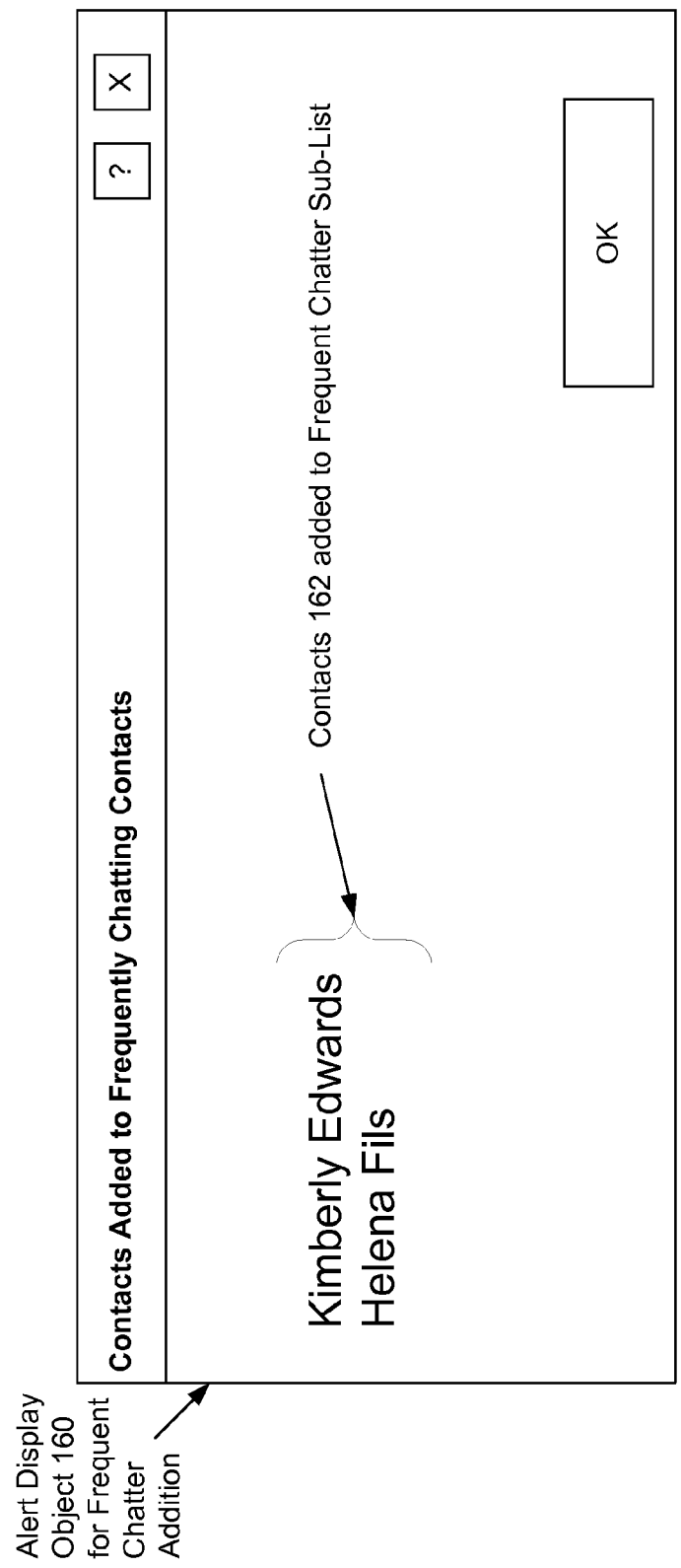
FIG. 8 is a partial screen shot showing an alert display object generated by an illustrative embodiment of the disclosed system.

FIG. 8 is a partial screen shot showing an Alert Display Object 160 generated by an illustrative embodiment of the disclosed system to inform the local user that a contact has been added to the frequent chatter sub-list. The Alert Display Object 160 is, for example, generated at the end of the frequent chatter determination time period, and the Contacts 162 added to the frequent chatter sub-list are added based on the counts of instant messaging sessions made during the immediately preceding frequent chatter determination time period. In the example of FIG. 8, the Contacts 162 indicate all contacts that have been added to the frequent chatter sub-list. Alternatively, the Contacts 162 may consist of the contact or contacts that the local user has requested alerts be generated for when they are added to the frequent chatter sub-list.

The disclosed system further generates alerts in response to contacts being removed from the frequent chatter sub-list using a display object resembling the Alert Display Object 160 shown in FIG. 8, albeit wherein the Contacts 162 indicates one or more contacts that have been removed from the frequent chatter sub-list based on the counts of instant messaging sessions made during the immediately preceding frequent chatter determination time period. Such removed contacts may also consist of contacts that the local user has requested alerts be generated for when they are removed from the frequent chatter sub-list.

While in the above description the term "contact list" is used to describe various embodiments of the disclosed system for an instant messaging system, that term is used only for purposes of explanation, and the disclosed system is not limited to use with user lists referred to by that term. Accordingly, those skilled in the art will recognize that the disclosed system may be embodied to apply to lists of users referred to as "buddies", or by any other specific term describing a collection of screen names or the like maintained within and displayed by an instant messaging program, through the display of which in a user interface instant messaging sessions can be immediately initiated by the local user clicking on individual names in the list.

Various advantageous extensions are possible based on the auto-sorting provided by the disclosed system. For example, on-line status information of frequent chatters may be prioritized for updating over non-frequent chatter on-line status information. Those skilled in the art will also recognize that other extensions based on the disclosed auto-sorting are also possible.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A computer implemented method for auto-sorting of a list in a user interface of a collaboration system, comprising:
   determining, for each element in the list, a frequency of actions associated with that element;
   determining a subset of the elements in the list having the highest frequencies of actions;
   locating the subset of elements in the list having the highest frequencies of actions in a sub-list at a top-most part of the list within the user interface of the collaboration system;
   enabling a local user to indicate through the user interface that an alert is to be displayed in response to a selected one of the elements being added to the sub-list;
   providing at least one alert to the local user in response to the selected one of the elements being added to the sub-list, wherein the alert is displayed separately from the list and wherein the alert visually indicates the addition of the selected one of the elements to the sub-list;
   wherein each element in the list represents a corresponding collaboration partner;
   broadcasting a first on-line status for the local user to collaboration partners represented by elements in the sub-list, wherein the first on-line status for the local user indicates that the local user is available for an instant messaging session; and
   broadcasting a second on-line status for the local user to collaboration partners represented by elements not in the sub-list, wherein the second on-line status for the local user indicates that the local user is not available for an instant messaging session.

2. The method of claim 1, further comprising:
   wherein the actions associated with elements in the list are collaborations between the local user and the corresponding collaboration partner.

3. A computer implemented method for auto-sorting of a list in a user interface of a collaboration system, comprising:
   determining, for each element in the list, a frequency of actions associated with that element;
   determining a subset of the elements in the list having the highest frequencies of actions;
   locating the subset of elements in the list having the highest frequencies of actions in a sub-list at a top-most part of the list within the user interface of the collaboration system;
   enabling a local user to indicate through the user interface that an alert is to be displayed in response to a selected one of the elements being added to the sub-list;
   providing at least one alert to the local user in response to the selected one of the elements being added to the sub-list, wherein the alert is displayed separately from the list and wherein the alert visually indicates the addition of the selected one of the elements to the sub-list;
   wherein each element in the list represents a corresponding collaboration component;
   wherein the actions associated with elements in the list are accesses to the corresponding collaboration component; and
   wherein the collaboration component is one of the set consisting of a Web address, event, collaborative document, activity object, and desktop application.

4. The method of claim 3, further comprising:
   determining a user configured size of the sub-list;
   determining a user configured set of collaboration components that can not be included within to the sub-list; and
   determining a user configured set of collaboration components that are to always be included in the sub-list.

5. A method for auto-sorting based on most frequently chatted-with contacts in an instant messaging application user interface, comprising:
   determining the frequency with which each contact in a local user's contact list has participated in instant messaging sessions with the local user;
   determining a predetermined number of contacts that have most frequently participated in instant messaging sessions with the local user;
   displaying the predetermined number of contacts that have most frequently participated in instant messaging sessions with the local user in a sub-list located in a top portion of a display of the contact list that is part of the instant messaging user interface;
   enabling a local user to indicate that an alert is to be displayed in response to a selected one of the contacts being added to the sub-list;
   determining that the selected contact has been added to the sub-list;
   responsive to determining that the selected contact has been added to the sub-list, displaying an alert to the local user informing the local user that the selected contact has been added to the sub-list, wherein the alert is displayed separately from the list;
   broadcasting a first on-line status for the local user to contacts in the sub-list, wherein the first on-line status for the local user indicates that the local user is available for an instant messaging session; and
   broadcasting a second on-line status for the local user to contacts not in the sub-list, wherein the second on-line status for the local user indicates that the local user is not available for an instant messaging session.

6. The method of claim 5, wherein determining the frequency with which each contact in the local user's contact list has participated in instant messaging sessions with the local user comprises counting the number of instant messaging sessions each contact in the local user's contact list has participated in over a predetermined time period.

7. The method of claim 5, further comprising:
   determining that a contact has been removed from the sub-list; and
   displaying an alert to the local user informing the local user that the contact has been removed from the sub-list.

8. The method of claim 7, further comprising:
   determining that at least one contact contained in the sub-list is to be removed from the sub-list; and
   responsive to determining that the at least one contact contained in the sub-list is to be removed from the sub-list, temporarily removing the contact from the sub-list until the sub-list is next recalculated.

9. The method of claim 8, further comprising:
   determining that at least one contact not contained in the sub-list is to be added to the sub-list located in the top portion of the display of the contact list; and responsive to the determining that the at least one contact not contained in the sub-list is to be added to the sub-list, temporarily adding the contact to the sub-list until the sub-list is next recalculated.

10. The method of claim 9, further comprising:
determining at least one of the contacts in the local user's contact list to be a primary contact; and
responsive to the determination that the contact is a primary contact, including the primary contact in the sub-list, regardless of how frequently the primary contact has participated in instant messaging sessions with the local user.

11. The method of claim 10, further comprising:
determining at least one of the contacts in the local user's contact list to be an excluded contact; and
responsive to the determination that the contact is an excluded contact, excluding the excluded contact from the sub-list, regardless of how frequently the excluded contact has participated in instant messaging sessions with the local user.

12. The method of claim 11, further comprising:
determining that at least one contact has been determined to be an excluded contact; and
responsive to the determination that at least one contact has been determined to be an excluded contact, displaying a user interface object enabling the local user to cause a list of excluded contacts to be displayed within the instant messaging user interface.

13. The method of claim 11, further comprising:
ordering the contacts within the sub-list based on a first criteria; and
ordering the contacts in the contact list below the sub-list based on a second criteria.

14. The method of claim 13, further comprising:
wherein the first criteria is how frequently each contact in the sub-list has participated in instant messaging sessions with the local user; and
wherein the second criteria is alphabetical order of contact screen names.

15. The method of claim 12, wherein the following are configured by the local user through the instant messaging user interface:
the predetermined time period;
the predetermined number of contacts that have most frequently participated in instant messaging sessions with the local user;
the at least one primary contact;
the at least one excluded contact;
the at least one added contact; and
the at least one removed contact.

16. A system including a non-transitory computer readable medium, the computer readable medium having program code stored thereon for auto-sorting based on most frequently chatted-with contacts in an instant messaging application user interface, the program code comprising:
program code for determining the frequency with which each contact in a local user's contact list has participated in instant messaging sessions with the local user;
program code for determining a predetermined number of contacts that have most frequently participated in instant messaging sessions with the local user;
program code for displaying the predetermined number of contacts that have most frequently participated in instant messaging sessions with the local user in a sub-list located in a top portion of a display of the contact list that is part of the instant messaging user interface;
program code for enabling a local user to indicate through user interface that an alert is to be displayed in response to a selected one of the contacts being added to the sub-list;
program code for determining that the selected contact has been added to the sub-list;
program code for, responsive to the determining that the selected contact has been added to the sub-list, displaying an alert to the local user informing the local user that the selected contact has been added to the sub-list, wherein the alert is displayed separately from the list and sub-list and wherein the alert visually indicates that the selected contact has been added to the sub-list;
program code for broadcasting a first on-line status for the local user to contacts in the sub-list, wherein the first on-line status for the local user indicates that the local user is available for an instant messaging session; and
program code for broadcasting a second on-line status for the local user to contacts not in the sub-list, wherein the second on-line status for the local user indicates that the local user is not available for an instant messaging session.

17. A computer program product including a non-transitory computer readable medium, the computer readable medium having program code stored thereon for auto-sorting based on most frequently chatted-with contacts in an instant messaging application user interface, the program code comprising:
program code for determining the frequency with which each contact in a local user's contact list has participated in instant messaging sessions with the local user;
program code for determining a predetermined number of contacts that have most frequently participated in instant messaging sessions with the local user;
program code for displaying the predetermined number of contacts that have most frequently participated in instant messaging sessions with the local user in a sub-list located in a top portion of a display of the contact list that is part of the instant messaging user interface;
program code for displaying at least one user interface display object enabling a local user to indicate that an alert is to be displayed in response to a selected contact being added to the sub-list;
program code for determining that the selected contact has been added to the sub-list;
program code for, responsive to the determining that the selected contact has been added to the sub-list, displaying an alert to the local user informing the local user that the selected contact has been added to the sub-list, wherein the alert is displayed separately from the list and sub-list and wherein the alert visually indicates that the selected contact that has been added to the sub-list;
program code for broadcasting a first on-line status for the local user to contacts in the sub-list, wherein the first on-line status for the local user indicates that the local user is available for an instant messaging session; and
program code for broadcasting a second on-line status for the local user to contacts not in the sub-list, wherein the second on-line status for the local user indicates that the local user is not available for an instant messaging session.

* * * * *